(12) United States Patent
Cho et al.

(10) Patent No.: US 12,098,493 B2
(45) Date of Patent: Sep. 24, 2024

(54) FILTER DEVICE AND WASHING MACHINE HAVING SAME

(71) Applicant: SAMSUNG ELECTRONICS CO., LTD., Suwon-si (KR)

(72) Inventors: Youngjin Cho, Suwon-si (KR); Kanghyun Lee, Suwon-si (KR); Byoungyull Yang, Suwon-si (KR); Jongho Lee, Suwon-si (KR); Sanggyu Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 335 days.

(21) Appl. No.: 17/577,102

(22) Filed: Jan. 17, 2022

(65) Prior Publication Data

US 2022/0228310 A1     Jul. 21, 2022

Related U.S. Application Data

(63) Continuation of application No. PCT/KR2022/000374, filed on Jan. 10, 2022.

(30) Foreign Application Priority Data

Jan. 15, 2021 (KR) .......................... 10-2021-0005683

(51) Int. Cl.
    *B01D 29/23*          (2006.01)
    *B01D 29/58*          (2006.01)
    (Continued)

(52) U.S. Cl.
    CPC ............ *D06F 39/10* (2013.01); *B01D 29/23* (2013.01); *B01D 29/58* (2013.01); *B01D 35/02* (2013.01); *B01D 35/30* (2013.01); *B01D 37/046* (2013.01); *D06F 23/02* (2013.01); *D06F 39/08* (2013.01); *D06F 39/085* (2013.01);
    (Continued)

(58) Field of Classification Search
None
See application file for complete search history.

(56) References Cited

U.S. PATENT DOCUMENTS

2005/0103701 A1    5/2005    Bechtum et al.
2014/0238089 A1*   8/2014    Jeong ................... F04D 29/628
                                                                 415/121.2
(Continued)

FOREIGN PATENT DOCUMENTS

CN           209568276 U      11/2019
EP            1 440 719 A1      7/2004
(Continued)

OTHER PUBLICATIONS

PCT/ISA/210 dated May 4, 2022 in International Patent Application No. PCT/KR2022/000374 (3 pages).

(Continued)

*Primary Examiner* — Levon J Shahinian
(74) *Attorney, Agent, or Firm* — STAAS & HALSEY LLP

(57) ABSTRACT

A filter device includes a case, an external filter disposed inside the case to filter substances introduced into the case and configured to be movable with respect to the case, and an internal filter disposed inside the external filter to filter the substances introduced into the case and configured to be movable with respect to the external filter.

19 Claims, 21 Drawing Sheets

(51) Int. Cl.
  *B01D 35/02* (2006.01)
  *B01D 35/30* (2006.01)
  *B01D 37/04* (2006.01)
  *D06F 23/02* (2006.01)
  *D06F 39/08* (2006.01)
  *D06F 39/10* (2006.01)

(52) U.S. Cl.
  CPC ............... *B01D 2201/0415* (2013.01); *B01D 2201/167* (2013.01); *B01D 2201/305* (2013.01); *B01D 2201/325* (2013.01)

(56) References Cited

U.S. PATENT DOCUMENTS

| | | |
|---|---|---|
| 2014/0366494 A1 | 12/2014 | Ardes |
| 2020/0122065 A1 | 4/2020 | Söderström et al. |
| 2020/0270795 A1 | 8/2020 | Zarcone et al. |

FOREIGN PATENT DOCUMENTS

| | | |
|---|---|---|
| EP | 2 772 582 A1 | 9/2014 |
| JP | 6-35607 | 2/1994 |
| JP | 2003-284899 | 10/2003 |
| JP | 2013-215731 A | 10/2013 |
| JP | 5328066 B2 | 10/2013 |
| KR | 10-2010-0015145 | 2/2010 |
| KR | 10-1375717 B1 | 3/2014 |
| KR | 10-2020-0083779 | 7/2020 |
| WO | WO 03/083201 A1 | 10/2003 |
| WO | 2020/089727 A1 | 5/2020 |

OTHER PUBLICATIONS

Office Action dated Dec. 6, 2023, in European Application No. 22739598.5.
Office Action dated Feb. 27, 2024, in European Application No. 22739598.5.

* cited by examiner

FILTER DEVICE AND WASHING MACHINE HAVING SAME

CROSS REFERENCE TO RELATED APPLICATIONS

This application is a continuation application under 35 U.S.C. § 111(a) of International Application No. PCT/KR2022/000374, filed on Jan. 10, 2022, which claims priority to Korean Patent Application No. 10-2021-0005683 filed on Jan. 15, 2021. The disclosures of International Application No. PCT/KR2022/000374 and Korean Patent Application No. 10-2021-0005683 are incorporated by reference herein in their entirety.

BACKGROUND

1. Field

Embodiments of the disclosure relate to a filter device and a washing machine having the same, and for example, to a filter device having an improved structure and a washing machine having the same.

2. Description of the Related Art

Washing machines are home appliances configured to wash clothes, towels, bedding, or the like. The washing machines may be classified into a drum-type washing machine configured to wash laundry by the repeated rising and falling of the laundry by rotating a drum and an electric-type washing machine configured to wash laundry using a water flow generated by a pulsator when a drum rotates.

Regardless of the type of washing machine, operations performed by the washing machine may include a washing operation of supplying detergent water to a tub in which the laundry is accommodated and washing the laundry while rotating the drum, a rinsing operation of supplying rinsing water to the tub and rinsing the laundry while rotating the drum, and a dehydration operation of discharging the water from the tub and removing moisture from the laundry by rotating the drum.

The water discharged from the tub may be discharged together with foreign substances generated from the laundry. Thus, the washing machine may include a filter device configured to filter the water discharged from the tub.

SUMMARY

Aspects of the disclosure will be set forth in part in the description which follows and, in part, will be apparent from the description, or may be learned by practice of the disclosure.

Therefore, one or more aspects of the disclosure relate to providing a filter device having an increased lifetime and a washing machine having the same.

One or more aspects of the disclosure relate to providing a filter device having a reduced size compared to performance and a washing machine having the same.

One or more aspects of the disclosure relate to providing a filter device having improved performance compared to a size thereof and a washing machine having the same.

One or more aspects of the disclosure relate to providing a filter device having improved convenience of use and a washing machine having the same.

In accordance with aspects of the disclosure, a filter device includes a case, an external filter disposed inside the case to filter substances introduced into the case and configured to be movable with respect to the case, and an internal filter disposed inside the external filter to filter the substances introduced into the case and configured to be movable with respect to the external filter.

The filter device may further include a first elastic member configured to support the internal filter so that the internal filter is movable with respect to the external filter.

The first elastic member may be compressed when a pressure of the substances introduced into the internal filter is greater than or equal to a first preset pressure.

The internal filter may be configured to, when the internal filter moves with respect to the external filter, form a first bypass passage to guide the substances introduced into the case between the internal filter and the external filter. The first elastic member may be configured to apply an elastic force to the internal filter in a direction in which the first bypass passage is closed.

The filter device may further include a second elastic member configured to support the external filter so that the external filter is movable with respect to the case.

A first elastic modulus of the first elastic member may be smaller than a second elastic modulus of the second elastic member.

The filter device may further include a sealing member configured to seal the second elastic member and the case.

The second elastic member may be compressed when a pressure of the substances introduced into the external filter is greater than or equal to a second preset pressure.

The external filter may be configured to, when the external filter moves with respect to the case, form a second bypass passage to guide the substances introduced into the case between the external filter and the case. The second elastic member may be configured to apply an elastic force to the external filter in a direction in which the second bypass passage is closed.

The filter device may further include a filter support compressed by the second elastic member, and a support protrusion protruding from a surface of the external filter to be in contact with the filter support. The filter support may be configured to form a discharge passage together with the support protrusion, and the discharge passage guides the substances inside the case to the outside of the case.

The internal filter may include a first filter opening configured to open the first bypass passage when the first elastic member is compressed.

The filter device may further include an intermediate filter disposed between the internal filter and the external filter.

In accordance with an aspect of the disclosure, a washing machine includes a cabinet, a tub disposed inside the cabinet to store washing water, and a filter device configured to filter the washing water discharged from the tub. The filter device includes a case, a first filter disposed inside the case and configured to open or close a first bypass passage through which the washing water discharged from the tub and introduced into the case bypasses the first filter, and a second filter disposed between the first filter and the case and configured to open or close a second bypass passage through which the washing water discharged from the tub and introduced into the case bypasses the second filter.

The filter device may be disposed inside the cabinet.

The washing machine may further include a drainage pump disposed between the tub and the filter device.

In accordance with an aspect of the disclosure, a filter device includes a case, a first filter disposed inside the case and configured to open or close a first bypass passage through which substances introduced into the case bypass the first filter, and a second filter disposed between the first filter and the case and configured to open or close a second bypass passage through which the substances introduced into the case bypass the second filter.

The filter device may further include a first elastic member compressed when a pressure of the substances introduced into the first filter is greater than or equal to a first preset pressure, and a second elastic member compressed when a pressure of the substances introduced into the second filter is greater than or equal to a second preset pressure, and the second elastic member having an elastic modulus greater than an elastic modulus of the first elastic member. The second preset pressure may be equal to the first preset pressure.

The first elastic member may be configured to press the first filter in a direction in which the first bypass passage is closed, and the second elastic member may be configured to press the second filter in a direction in which the second bypass passage is closed.

The second filter may be supported to be movable with respect to the case, and the first filter may be supported to be movable with respect to the second filter.

The first filter may be configured to filter substances having larger sizes than those of substances filtered by the second filter.

BRIEF DESCRIPTION OF THE DRAWINGS

These and/or other aspects of the disclosure will become apparent and more readily appreciated from the following description of the example embodiments, taken in conjunction with the accompanying drawings of which.

DETAILED DESCRIPTION

Figure 1:
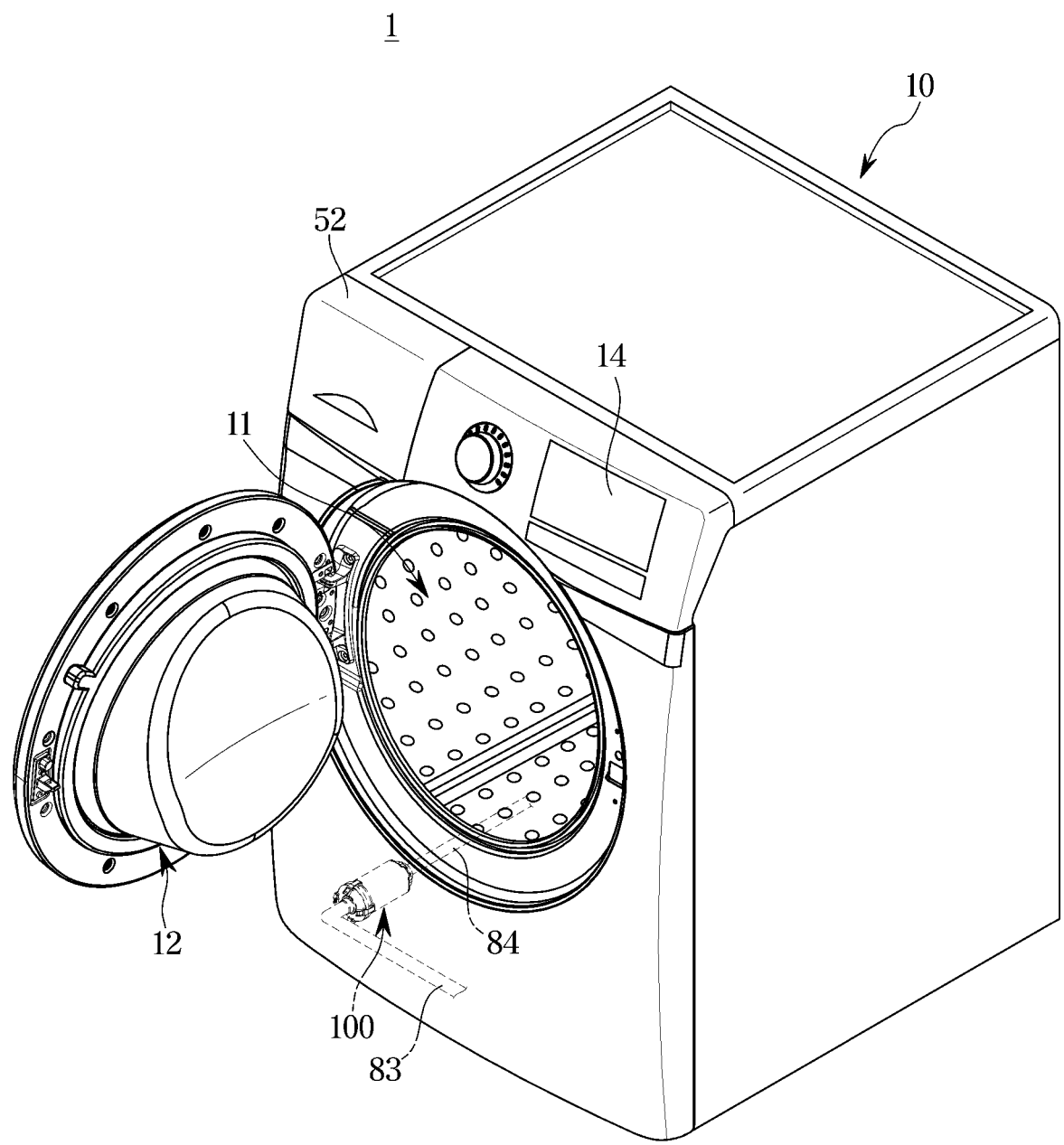
FIG. 1 is a view illustrating a washing machine to which a filter device is applied according to an embodiment of the disclosure.

Configurations illustrated in example embodiments and the accompanying drawings disclosed in the specification are merely example embodiments of the disclosure, and various modifications may be made to replace the embodiments and the drawings of the specification.

Further, the same reference numerals or symbols presented in each drawing of the specification indicate parts or components that perform substantially the same function.

Further, terms used in the specification are used only to describe the embodiments and are not intended to limit/restrict the disclosure. Singular expressions include plural expressions unless clearly otherwise indicated in the context. In the specification, terms such as "include" or "have" are intended to indicate that there are features, numbers, steps, operations, components, parts, or combinations thereof that are described in the specification and do not exclude, in advance, the possibility of the presence or addition of one or more other features, numbers, steps, operations, components, parts, or combinations thereof.

Further, in the specification, terms including an ordinal number such as "first" and "second" may be used to describe various components, but the components are not limited by the above terms, and the terms are used only to distinguish one component from other components. For example, without departing from the scope of the disclosure, a first component may be referred to as a second component, and similarly, the second component may be also referred to as the first component.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

It will be understood that when an element is referred to as being "connected" to another element, the expression encompasses an example of a direct connection or direct coupling, as well as a connection or coupling with another element interposed therebetween.

Hereinafter, embodiments of the disclosure will be described in detail with reference to the accompanying drawings.

Figure 2:
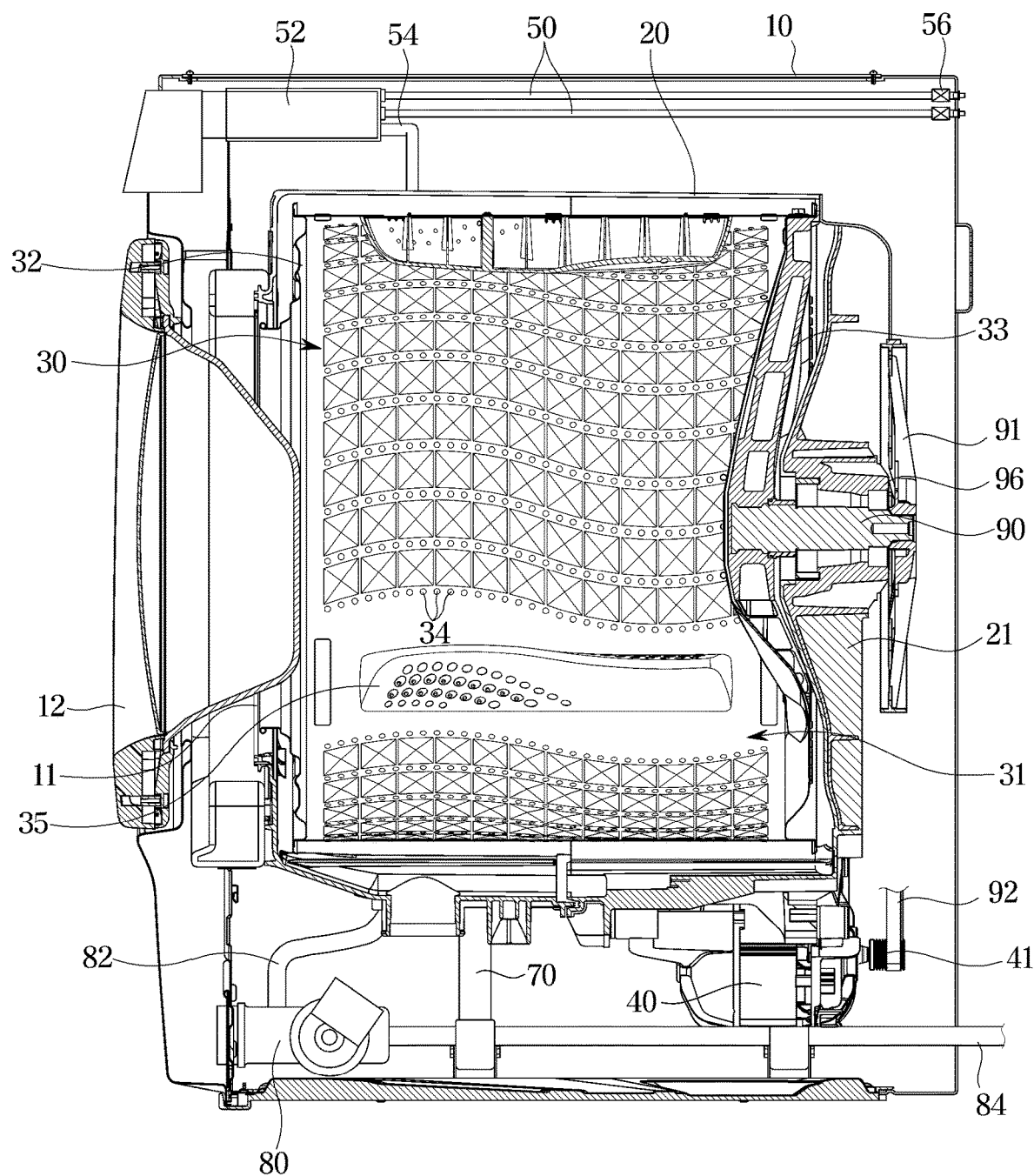
FIG. 2 is a side cross-sectional view of the washing machine illustrated in FIG. 1.

FIG. 1 is a view illustrating a washing machine to which a filter device is applied according to an embodiment of the disclosure. FIG. 2 is a side cross-sectional view of the washing machine illustrated in FIG. 1.

As illustrated in FIGS. 1 and 2, a washing machine 1 includes a cabinet 10 forming an exterior, a tub 20 disposed inside the cabinet 10, a drum 30 rotatably disposed inside the tub 20, and a driving motor 40 configured to drive the drum 30.

An input port 11 is formed in a front portion of the cabinet 10 so that laundry may be put into the drum 30. The input port 11 is opened or closed by a door 12 installed in the front portion of the cabinet 10.

A water supply pipe 50 configured to supply washing water to the tub 20 is installed at an upper portion of the tub 20. One side of the water supply pipe 50 is connected to a water supply valve 56, and the other side of the water supply pipe 50 is connected to a detergent box 52.

The detergent box 52 is connected to the tub 20 through a connection pipe 54. Water supplied through the water supply pipe 50 is supplied into the tub 20 via the detergent box 52 together with a detergent.

The tub 20 is supported by a damper 70. The damper 70 connects an inner bottom surface of the cabinet 10 and an outer surface of the tub 20.

The drum 30 includes a cylindrical portion 31, a front plate 32 disposed in front of the cylindrical portion 31, and a rear plate 33 disposed behind the cylindrical portion 31. An opening through which the laundry is introduced or discharged is formed in the front plate 32, and a shaft 90 configured to transmit power of the driving motor 40 is connected to the rear plate 33.

A plurality of through-holes 34 for circulation of the washing water are formed around the drum 30, and a plurality of lifters 35 are formed on an inner peripheral surface of the drum 30 so that, when the drum 30 rotates, the laundry may rise and fall.

The drum 30 and the driving motor 40 are connected through the shaft 90, and a drive type may be classified into a direct drive type in which the shaft 90 is directly connected to the driving motor 40 to rotate the drum 30 and an indirect drive type in which a pulley 91 is connected between the driving motor 40 and the shaft 90 to drive the drum 30 according to the type of connection between the shaft 90 and the driving motor 40.

The washing machine 1 according to an embodiment of the disclosure may be provided as the indirect drive type, but the disclosure is not limited thereto, and the technical features of the disclosure may be applied even to the direct drive type.

One end of the shaft 90 is connected to the rear plate 33 of the drum 30, and the other end of the shaft 90 extends outward from a rear portion 21 of the tub 20. The other end of the shaft 90 may be inserted into the pulley 91 to obtain a driving force from the driving motor 40. Further, a motor pulley 41 is formed on a rotary shaft of the driving motor 40. A driving belt 92 is provided between the motor pulley 41 and the pulley 91, and thus the shaft 90 may be driven by the driving belt 92.

The driving motor 40 may be disposed on one side of a lower portion of the tub 20 and drive the shaft 90 while the driving belt 92 rotates clockwise or counterclockwise in a vertical direction of the tub 20.

A bearing housing 96 is installed in the rear portion 21 of the tub 20 to rotatably support the shaft 90. The bearing housing 96 may be made of an aluminum alloy and may be inserted into the rear portion 21 of the tub 20 when the tub 20 is injection-molded.

A drainage pump 80 configured to discharge the water inside the tub 20 to the outside of the cabinet 10, a connection hose 82 connecting the tub 20 and the drainage pump 80 so that the water inside the tub 20 may be introduced into the drainage pump 80, and a drainage hose 84 configured to guide the water pumped by the drainage pump 80 to the outside of the cabinet 10 are provided at the lower portion of the tub 20.

A filter device 100 may be provided between the drainage hose 84 and the drainage pump 80. A guide hose 83 may connect the drainage pump 80 and the filter device 100. The filter device 100 may filter the washing water discharged from the drainage pump 80 before the washing water is discharged to the outside of the washing machine 1. The filter device 100 may be located on a left side of a front lower end inside the cabinet 10 when facing the front side of the washing machine 1 having the door 12. However, the disclosure is not so limited and the filter device 100 may be disposed at other locations inside or outside of the cabinet 10.

Meanwhile, a display 14 configured to display a state of the washing machine 1 to a user may be provided on a front upper portion of the cabinet 10. The display 14 may include an inputter. A printed circuit board assembly (not illustrated) may be provided in the front upper portion of the cabinet 10.

Figure 3:
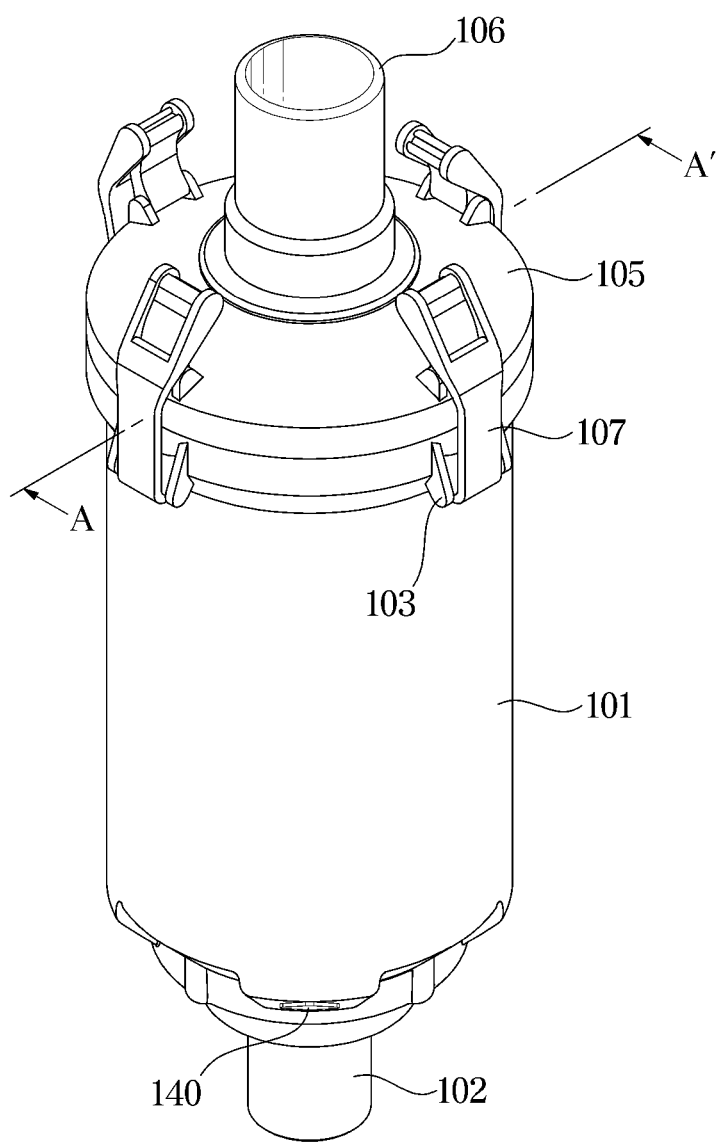
FIG. 3 is a view illustrating the filter device illustrated in FIG. 1.
Figure 4:
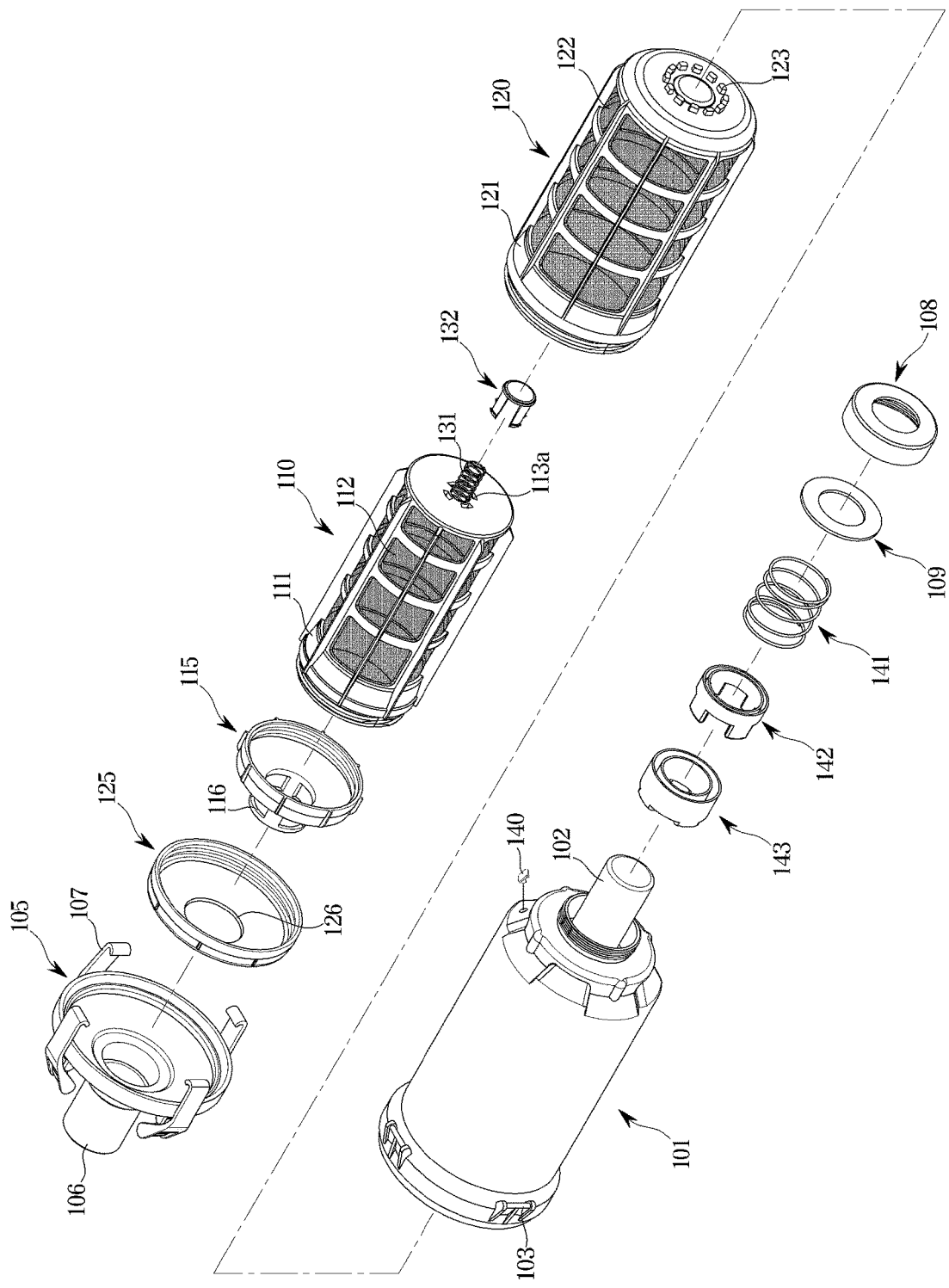
FIG. 4 is an exploded view illustrating the filter device illustrated in FIG. 3.
Figure 5:
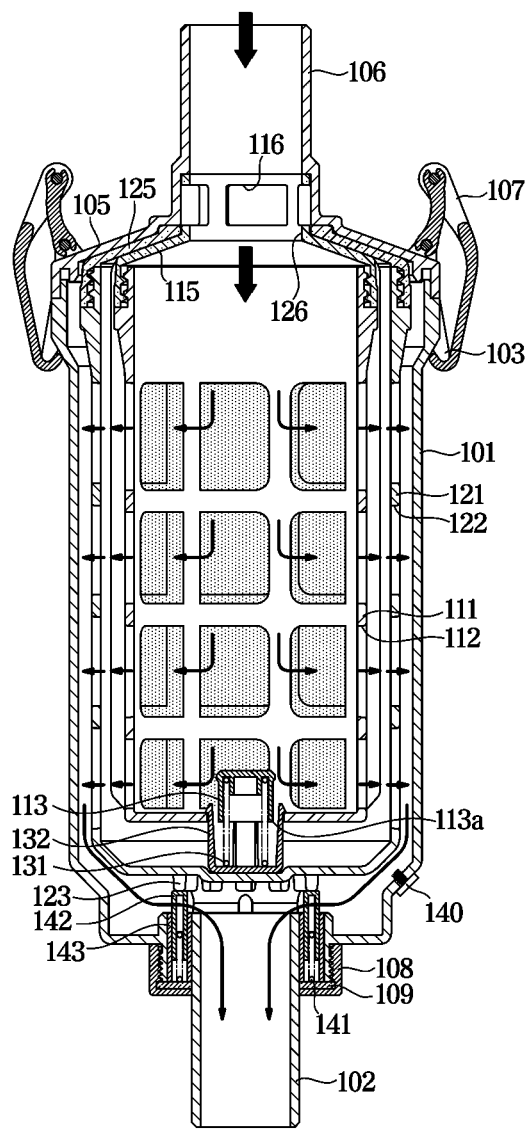
FIG. 5 is a cross-sectional view taken along line A-A' illustrated in FIG. 3.
Figure 6:
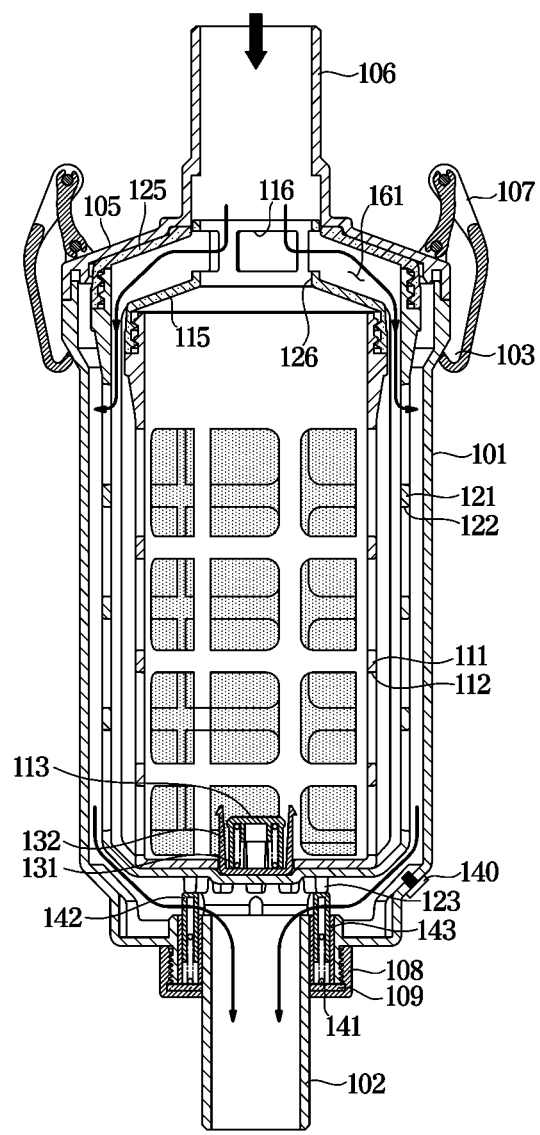
FIG. 6 is a view illustrating a state in which a first filter of the filter device illustrated in FIG. 5 is clogged.
Figure 7:
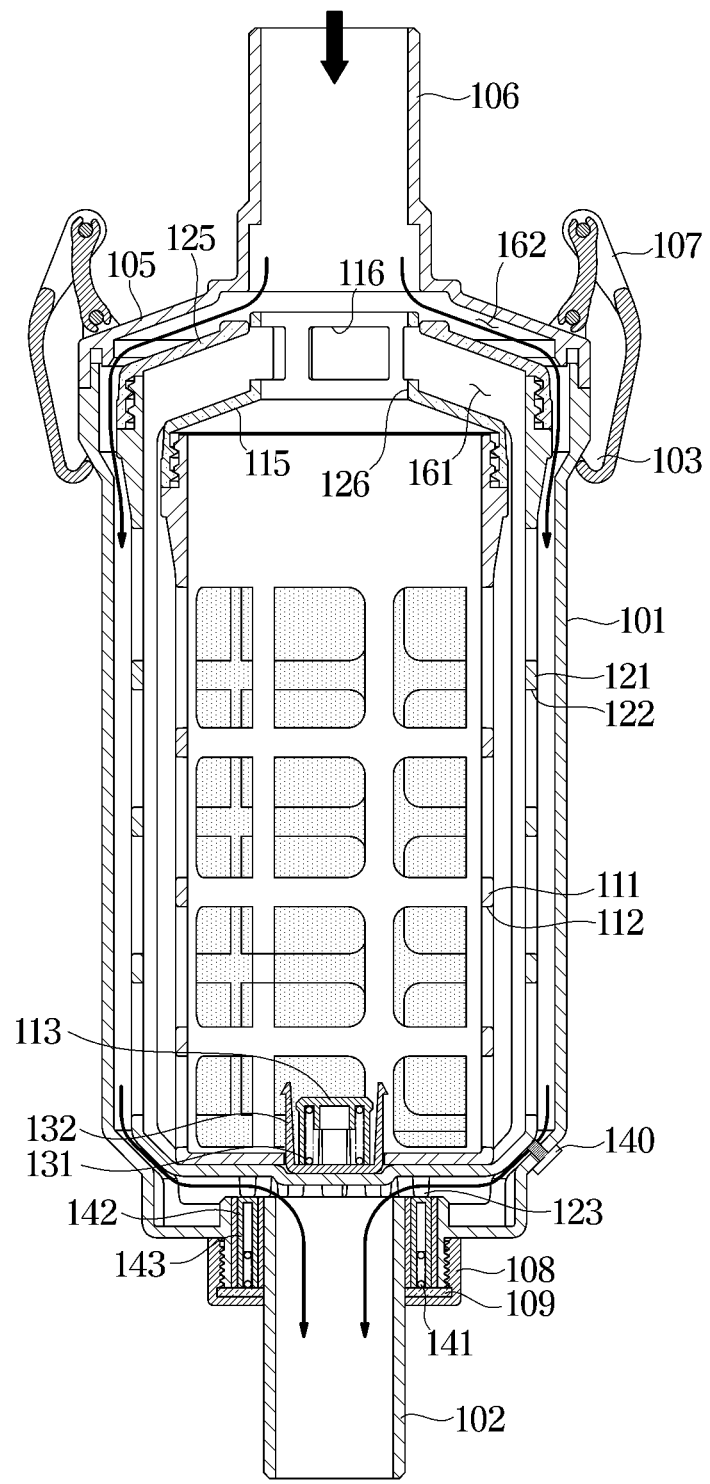
FIG. 7 is a view illustrating a state in which both the first filter and a second filter of the filter device illustrated in FIG. 6 are clogged.

FIG. 3 is a view illustrating the filter device illustrated in FIG. 1. FIG. 4 is an exploded view illustrating the filter device illustrated in FIG. 3. FIG. 5 is a cross-sectional view taken along line A-A' illustrated in FIG. 3. FIG. 6 is a view illustrating a state in which a first filter of the filter device illustrated in FIG. 5 is clogged. FIG. 7 is a view illustrating a state in which both the first filter and a second filter of the filter device illustrated in FIG. 6 are clogged.

Referring to FIGS. 3 and 4, the filter device 100 may include a case 101, a first filter 110, and a second filter 120.

The case 101 may form an exterior of the filter device 100. The case 101 may have a substantially cylindrical shape. The first filter 110 and the second filter 120 may be accommodated inside the case 101. Thus, the first filter 110 may be considered as an internal filter 110, and the second filter 120 may be considered as an external filter 120.

The case 101 may include an outlet 102. The outlet 102 may be connected to the drainage hose 84. The outlet 102 may guide, to the drainage hose 84, the washing water filtered while passing through the first filter 110 and the second filter 120.

The case 101 may be formed so that one end opposite to the other end at which the outlet 102 is located is open. The open one end of the case 101 may be opened or closed by a case lid 105.

The case 101 may include a catch 103 selectively coupled to a latch 107 of the case lid 105. When the case lid 105 is coupled to the case 101, as the latch 107 is locked, the catch 103 may fix the case lid 105 to the case 101.

The case lid 105 may be detachably coupled to the case 101. When the case lid 105 is separated from the case 101, the first filter 110 and the second filter 120 may be inserted into the case 101 or the first filter 110 and the second filter 120 may be extracted from the inside of the case 101. Accordingly, in the filter device 100 according to an embodiment of the disclosure, the first filter 110 and the second filter 120 may be easily replaced.

The first filter 110 may be movably provided inside the case 101. The first filter 110 may be movably provided inside the second filter 120 provided inside the case 101. The first filter 110 may be provided to filter foreign substances having a predetermined size from the washing water introduced into the filter device 100. The first filter 110 may be provided to be movable between a first filtering location in which substances introduced into the filter device 100 are filtered and a first bypass location in which the substances introduced into the filter device 100 are bypassed.

The first filter 110 may include a first filter body 111 and a first filterer 112 provided along an outer peripheral surface of the first filter body 111.

The first filter 110 may be provided to be movable with respect to the second filter 120. The filter device 100 may include a first elastic member 131 provided to elastically support the first filter 110 with respect to the second filter 120.

One end of the first elastic member 131 may be supported by a first elastic member fixer 113 formed in the first filter body 111, and the other end thereof may be supported by a first filter support 132.

A portion of the first filter support 132 may be inserted into and fixed to a filter guide 113a formed in the first filter body 111. The first filter support 132 may be coupled to the first filter body 111 in a hook manner.

The first filter support 132 may move with respect to the first filter body 111 as the first elastic member 131 is compressed. For example, when the first elastic member 131 is compressed, the first filter support 132 may relatively move in a direction of being inserted into the first filter body 111.

The first elastic member 131 may elastically press the first filter support 132 in a direction away from the first filter body 111. When the first filter 110 is inserted into the second filter 120, the first filter support 132 may be supported by an inner surface of a second filter body 121.

A first filter lid 115 may be coupled to one end opposite to the other end of the first filter body 111 in which the first elastic member 131 is located. The first filter lid 115 may be detachably coupled to the first filter body 111.

The first filter lid 115 may include a first filter opening 116. The first filter opening 116 may be formed to open bypass passages 161 and 162 (see FIGS. 6 and 7) when the first filter 110 moves with respect to the second filter 120 in a direction in which the first elastic member 131 is compressed. The first filter opening 116 may be formed to close the bypass passages 161 and 162 (see FIG. 5) when the first filter 110 moves with respect to the second filter 120 in a direction in which the first elastic member 131 is stretched.

The second filter 120 may be movably provided inside the case 101. The second filter 120 may be provided to accommodate the first filter 110 therein. The second filter 120 may be provided to filter foreign substances having a predetermined size from the washing water introduced into the filter device 100. For example, the second filter 120 may be provided to filter foreign substances having a predetermined size from the washing water filtered by the first filter 110 or to filter out foreign substances having a predetermined size from the washing water (see FIG. 6) introduced through the first bypass passage 161 without passing through the first filter 110. The second filter 120 may be provided to be movable between a second filtering location in which substances passing through the first filter 110 or substances bypassing the first filter 110 are filtered and a second bypass location in which substances passing through the first filter 110 or substances bypassing the first filter 110 are bypassed.

The first filter 110 may be provided to be movable between the first filtering location in which substances introduced into the filter device 100 are filtered and the first bypass location in which the substances introduced into the filter device 100 are bypassed.

The second filter 120 may include a second filter body 121 and a second filterer 122 provided along an outer peripheral surface of the second filter body 121.

The second filter 120 may be provided to be movable with respect to the case 101. The filter device 100 may include a second elastic member 141 provided to elastically support the second filter 120 with respect to the case 101. The first elastic modulus of the first elastic member 131 may be smaller than a second elastic modulus of the second elastic member 141.

One end of the second elastic member 141 may be supported by a second filter support 142 and the other end thereof may be supported by a cover 108 of the case 101.

The filter device 100 may include a first sealing member 143 coupled to the case 101. The second filter support 142 may be movably inserted into the first sealing member 143. The second elastic member 141 may be disposed inside the second filter support 142. The first sealing member 143 may perform sealing between the case 101 and the second filter support 142.

The second filter support 142 may move with respect to the case 101 as the second elastic member 141 is compressed. For example, when the second elastic member 141 is compressed, the second filter support 142 may relatively move in a direction in which the second filter 120 is inserted into the case 101.

The second elastic member 141 may elastically press the second filter support 142 in a direction in which the second filter 120 is extracted from the case 101. The second filter support 142 may apply an elastic force to the second filter 120 in a direction in which the second bypass passage 162 is closed.

The second filter body 121 may include a plurality of support protrusions 123 protruding toward the second filter support 142 when being inserted into the case 101. The plurality of support protrusions 123 may be arranged to be spaced apart from each other, for example, in a circumferential direction. When in contact with the second filter support 142, the support protrusions 123 may be provided to form a discharge passage configured to guide the washing water introduced into the filter device 100 to the outlet 102.

A second filter lid 125 may be coupled to one end opposite to the other end of the second filter body 121 supported by the second filter support 142. The second filter lid 125 may be detachably coupled to the second filter body 121.

The second filter lid 125 may include a second filter opening 126. A portion of the first filter lid 115 may be inserted into the second filter opening 126.

The case 101 may include the cover 108 detachably provided on a portion in which the second elastic member 141 is located. A second sealing member 109 may be provided in at least a portion between the cover 108 and the case 101. One end of the second elastic member 141 may be in contact with the second sealing member 109. The second elastic member 141 may be supported by the cover 108.

Referring to FIGS. 5 to 7, an operation of the filter device 100 according to an embodiment of the disclosure will be described.

Referring to FIG. 5, when both the first filter 110 and the second filter 120 are not clogged and are in a normal state, the washing water introduced into the filter device 100 may be filtered while sequentially passing through the first filter 110 and the second filter 120 and then discharged through the outlet 102. For example, washing water may pass through the inlet 106 into the first filter 110 (for example, in an axial direction), to be filtered using the first filterer 112. The washing water may then pass from the first filter 110 to the second filter 120 (for example, in a radial direction), to be filtered using the second filterer 122.

Referring to FIG. 6, when the first filter 110 is clogged, the first elastic member 131 is compressed due to a water pressure of the washing water introduced into the filter device 100, and the first filter 110 moves with respect to the second filter 120. As the first filter 110 moves due to the water pressure, the first filter opening 116 of the first filter lid 115 is opened, and the first bypass passage 161 is formed. For example, the first bypass passage 161 may be formed between an inner surface of the second filter lid 125 and an outer surface of the first filter lid 115 and extend to a space between the first filter body 111 and the second filter body 121. Accordingly, the washing water introduced through an inlet 106 is guided not to the inside of the first filter 110 but to the first bypass passage 161. The washing water guided to the first bypass passage 161 is filtered by the second filter 120. The washing water filtered by the second filter 120 may be discharged to the outside of the filter device 100 through the outlet 102.

Referring to FIG. 7, when both the first filter 110 and the second filter 120 are clogged, the second elastic member 141 is compressed due to the water pressure of the washing water introduced into the filter device 100, and the second filter 120 moves with respect to the case 101. As the second filter 120 moves due to the water pressure, the second bypass passage 162 is formed. For example, the second bypass passage 162 may be formed between an inner surface of the case lid 105 and an outer surface of the second filter lid 125 and extend to a space between the second filter body 121 and the case 101. Accordingly, the washing water introduced through the inlet 106 is guided not to the inside of the second filter 120 but to the second bypass passage 162. The washing water guided to the second bypass passage 162 may be discharged to the outside of the filter device 100 through the outlet 102 without the filtering process.

According to this configuration, the washing machine 1 according to the embodiment of the disclosure is provided to be operable only using the second filter 120 when the first filter 110 is clogged and may thus be used until both the filters 110 and 120 are clogged, thereby increasing a lifetime of the filter device 100.

For example, when a plurality of filters are connected in series, when a filter located upstream is clogged, even when the filter located downstream is not clogged, the filter device should be replaced. However, when the first filter 110 and the second filter 120 are configured like the filter device 100 according to the embodiment of the disclosure, both the first filter 110 and the second filter 120 may be used, and accordingly, the lifetime can be increased approximately two or three times.

Figure 8:
FIG. 8 is a control block diagram for determining and displaying a replacement time of the filter device illustrated in FIG. 3.
Figure 9:
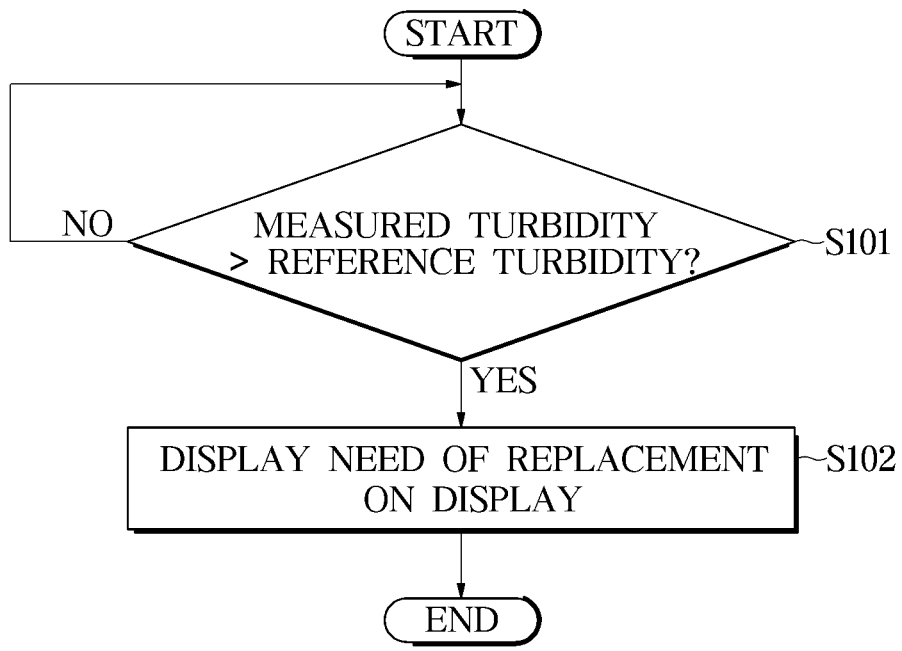
FIG. 9 is a flowchart illustrating a process for determining and displaying the replacement time of the filter device illustrated in FIG. 3 according to an embodiment of the disclosure.
Figure 10:
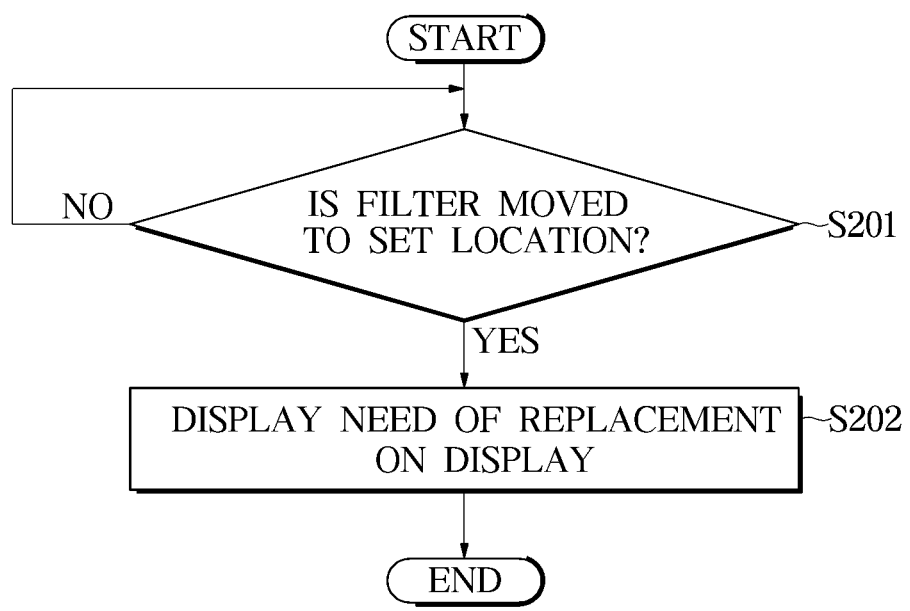
FIG. 10 is a flowchart illustrating a process for determining and displaying the replacement time of the filter device illustrated in FIG. 3 according to an embodiment of the disclosure.

FIG. 8 is a control block diagram for determining and displaying a replacement time of the filter device illustrated in FIG. 3. FIG. 9 is a flowchart illustrating a process for determining and displaying the replacement time of the filter device illustrated in FIG. 3 according to an embodiment. FIG. 10 is a flowchart illustrating a process for determining and displaying the replacement time of the filter device illustrated in FIG. 3 according to another embodiment.

Referring to FIG. 8, the filter device 100 may include a sensor 140 configured to identify the replacement time of the first filter 110 and/or the second filter 120. Referring to FIGS. 3 and 4, the sensor 140 may be installed in the case 101.

The sensor 140 may be provided to measure the turbidity of the washing water passing through the filter device 100. The sensor 140 may be provided to measure the turbidity using an electrode.

In another example, the sensor 140 may be provided to detect the location of the second filter 120 of the filter device 100. The sensor 140 may be provided to detect that the second filter 120 comes into contact with the sensor 140 as the second filter 120 is clogged and thus moves in a drainage direction. The sensor 140 may be provided as an infrared sensor and may be provided to measure a distance to the second filter 120.

The sensor 140 may transmit the measured information to a controller 19. The controller 19 may be provided to determine the replacement time of the first filter 110 and/or the second filter 120 on the basis of the information transmitted from the sensor 140 and to display the need for replacement of the first filter 110 and/or the second filter 120 to the user through the display 14. The display 14 may be configured to visually and/or audibly display the information to the user.

For example, referring to FIG. 9, when the sensor 140 is provided to measure the turbidity of the washing water passing through the filter device 100, the controller 19 compares the turbidity of the washing water measured by the sensor 140 with a reference turbidity. (S101)

When the turbidity of the washing water measured by the sensor 140 is higher than the reference turbidity, the controller 19 may determine that the replacement of the first filter 110 and/or the second filter 120 is needed and control the display 14 to display that the replacement of the first filter 110 and/or the second filter 120 is needed to the user. (S102)

On the other hand, when the turbidity of the washing water measured by the sensor 140 is lower than the reference turbidity, the controller 19 determines that the replacement of the first filter 110 and/or the second filter 120 is not yet needed and compares the turbidity of the washing water measured by the sensor 140 again with the reference turbidity. The sensor 140 may be configured to measure the turbidity of the washing water at a preset period. The controller 19 may perform an operation of comparing the turbidity of the washing water transmitted from the sensor 140 with the reference turbidity at a preset period.

Referring to FIG. 10, when the sensor 140 is provided to detect the location of the second filter 120, the controller 19 determines whether or not the second filter 120 moves to a preset location. (S201). For example, the controller 19 measures or determines whether or not the second filter 120 is clogged and is thus pushed and moved to the preset location in a direction in which the washing water is drained. That is, the controller 19 determines whether or not the second filter 120 moves to a location illustrated in FIG. 7.

When the second filter 120 is clogged and is thus moved to the preset location, the controller 19 may determine that the replacement of the first filter 110 and/or the second filter 120 is needed and may thus control the display 14 to display that the replacement of the first filter 110 and/or the second filter 120 is needed to the user. (S202).

On the other hand, when the second filter 120 is not clogged and is thus not yet moved to the preset location, the controller 19 determines that the replacement of the first filter 110 and/or the second filter 120 is not yet needed and thus measures the location of the second filter 120 again. The sensor 140 may be configured to measure the location of the second filter 120 at a preset period. The controller 19 may perform an operation of determining whether or not the second filter 120 moves to the preset location at a preset period.

Figure 11:
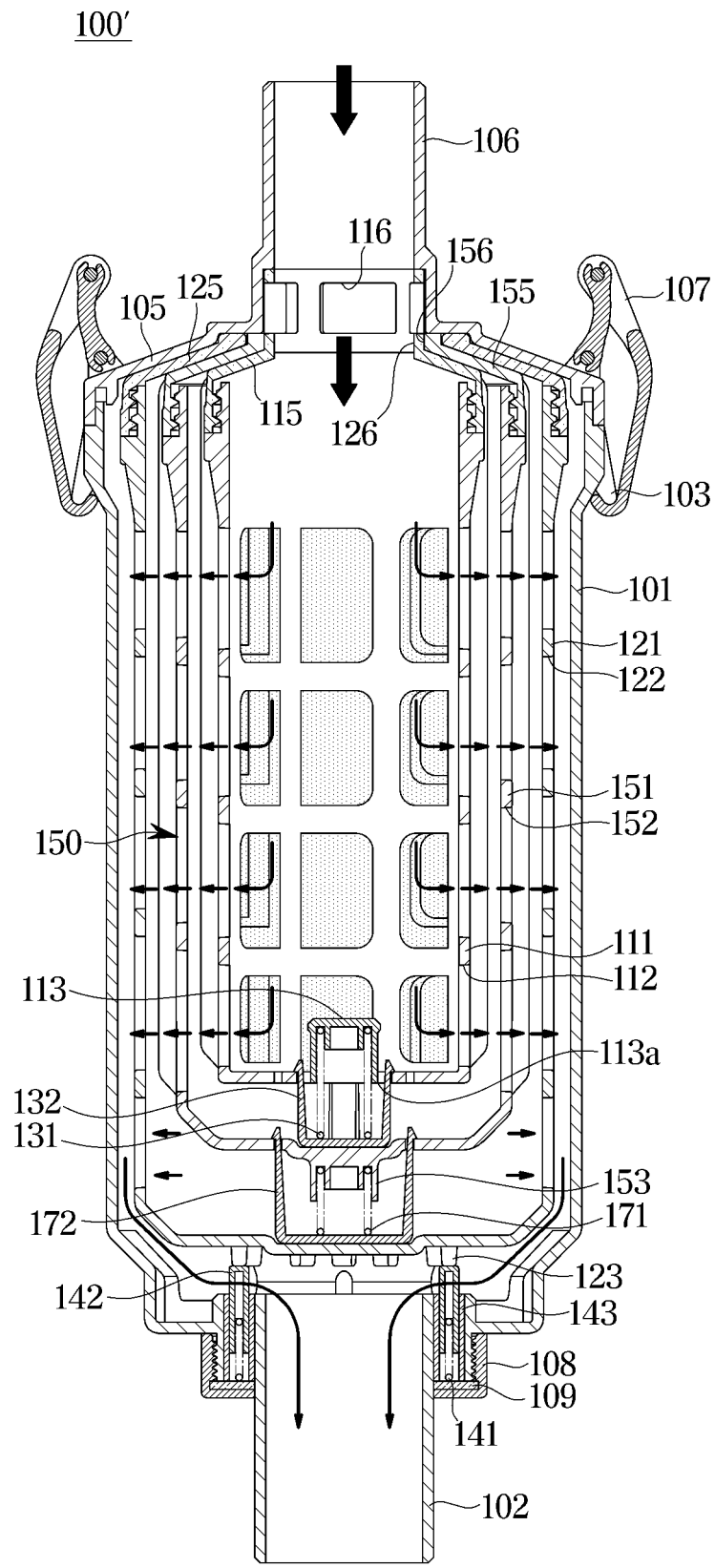
FIG. 11 is a cross-sectional view of a filter device according to an embodiment of the disclosure.
Figure 12:
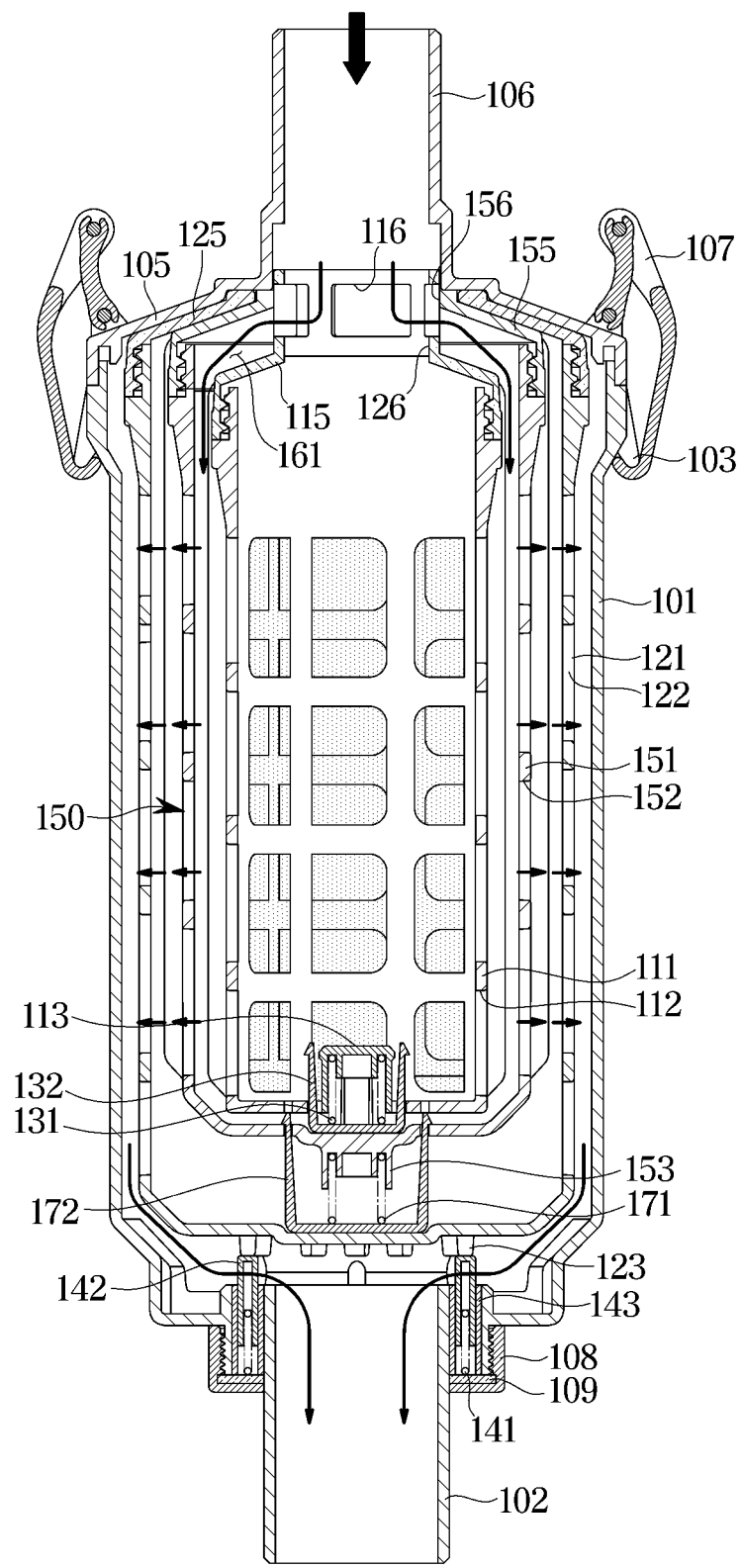
FIG. 12 is a view illustrating a state in which a first filter of the filter device illustrated in FIG. 11 is clogged.
Figure 13:
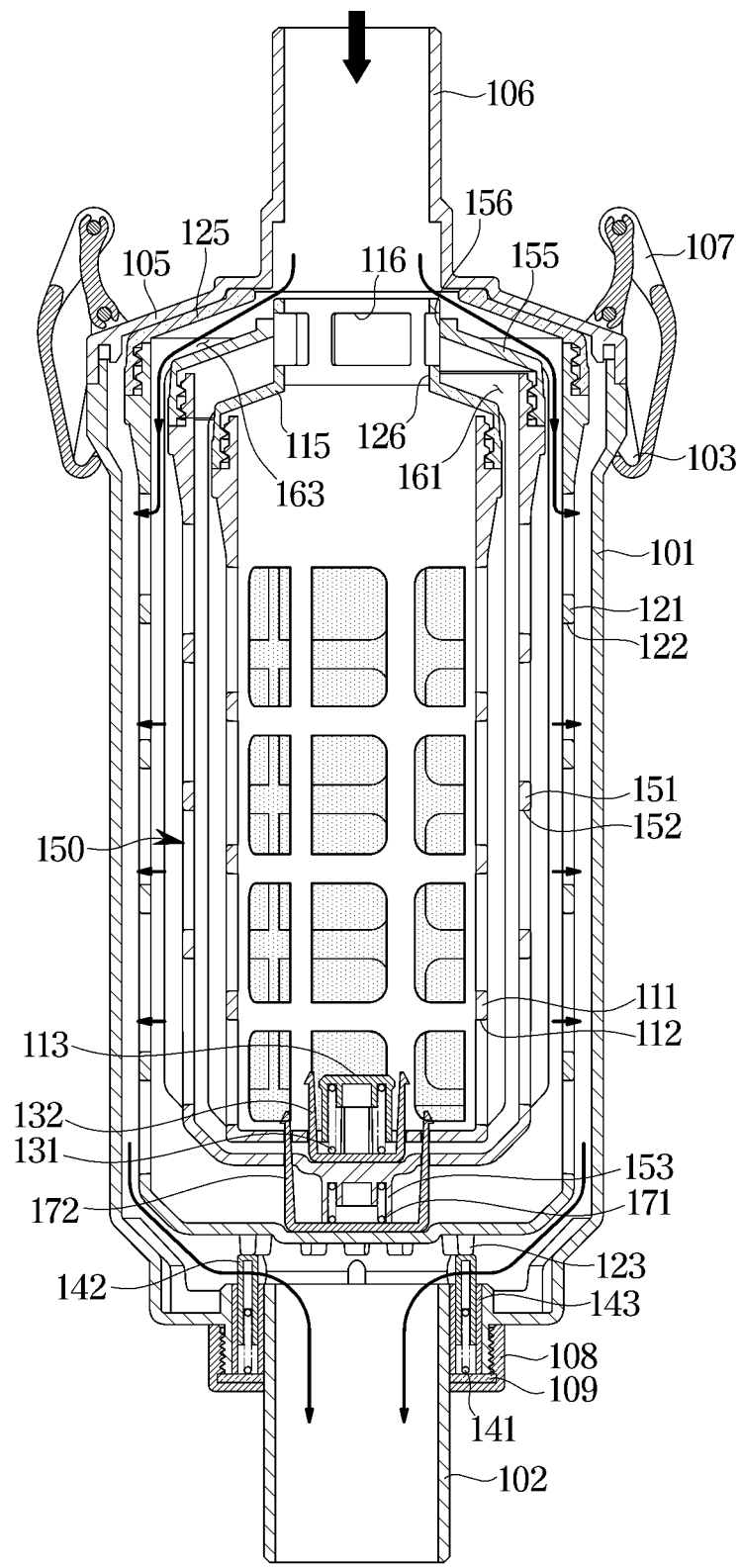
FIG. 13 is a view illustrating a state in which a third filter of the filter device illustrated in FIG. 12 is clogged.
Figure 14:
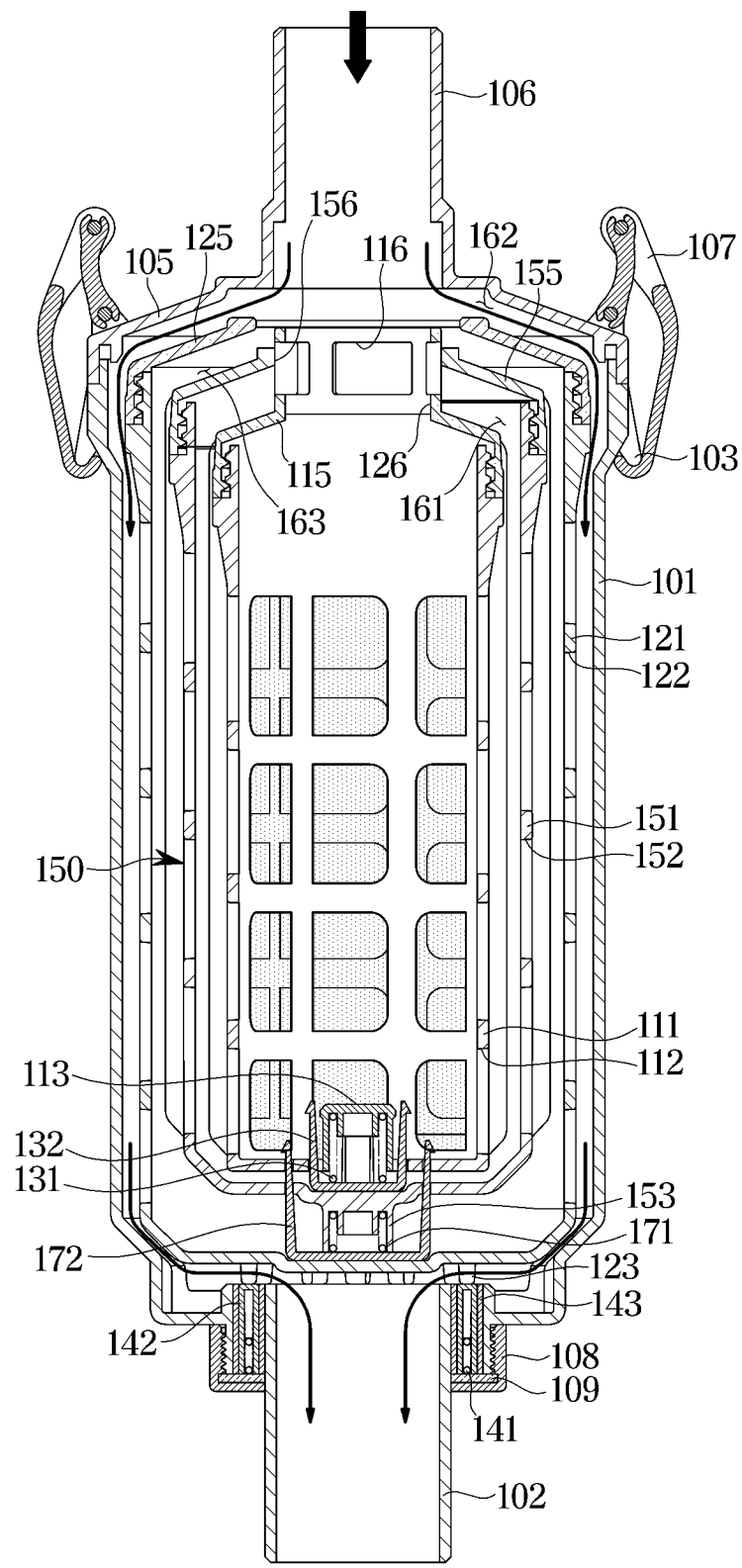
FIG. 14 is a view illustrating a state in which a second filter of the filter device illustrated in FIG. 13 is clogged.

FIG. 11 is a cross-sectional view of a filter device according to an embodiment of the disclosure. FIG. 12 is a view illustrating a state in which a first filter of the filter device illustrated in FIG. 11 is clogged. FIG. 13 is a view illustrating a state in which a third filter of the filter device illustrated in FIG. 12 is clogged. FIG. 14 is a view illustrating a state in which a second filter of the filter device illustrated in FIG. 13 is clogged.

Referring to FIGS. 11 to 14, the filter device according to an embodiment of the disclosure will be described. However, the same reference components as those of the embodiment illustrated in FIGS. 1 to 7 are designated by the same reference numerals, and a detailed description thereof will be omitted.

Unlike the filter device 100 illustrated in FIGS. 1 to 7, the filter device 100' according to an embodiment of the disclosure further includes a third filter 150 disposed between the first filter body 111 and the second filter body 121. Thus, the third filter 150 may be considered as an intermediate filter 150. Although not shown, the filter device 100' may also include the sensor 140.

The third filter 150 may include a third filter body 151 and a third filterer 152. A third filter lid 155 may be detachably mounted on one open end of the third filter body 151. The third filter lid 155 may include a third filter opening 156 into which a portion of the first filter lid 115 is inserted.

A third elastic member fixer 153 may be provided in one end opposite to the other end of the third filter body 151. One end of a third elastic member 171 may be fixed to the third elastic member fixer 153. The other end of the third elastic member 171 may be fixed to a third filter support 172. The third filter support 172 may be supported by the second filter body 121.

Referring to FIG. 11, when all of the first filter 110, the third filter 150, and the second filter 120 are not clogged, substances introduced into the inlet 106 may be filtered while sequentially passing through the first filter 110, the third filter 150, and the second filter 120 and may then be discharged through the outlet 102. For example, washing water may pass through the inlet 106 into the first filter 110 (for example, in an axial direction), to be filtered using the first filterer 112. The washing water may then pass from the first filter 110 to the third filter 150 (for example, in a radial direction), to be filtered using the third filterer 152. The washing water may then pass from the third filter 150 to the second filter 120 (for example, in a radial direction), to be filtered using the second filterer 122.

Referring to FIG. 12, when the first filter 110 is clogged, the first bypass passage 161 is opened. The substances introduced into the inlet 106 may pass through the first bypass passage 161, may be filtered while sequentially passing through the third filter 150 and the second filter 120, and may then be discharged through the outlet 102. For example, the first bypass passage 161 may be formed between an inner surface of the third filter lid 155 and an outer surface of the first filter lid 115 and extend to a space between the first filter body 111 and the third filter body 151.

Referring to FIG. 13, when the first filter 110 and the third filter 150 are clogged, a third bypass passage 163 is opened. The substances introduced into the inlet 106 may pass through the third bypass passage 163, may be filtered while passing through the second filter 120, and may then be discharged through the outlet 102. For example, the third bypass passage 163 may be formed between an inner surface of the second filter lid 125 and an outer surface of the third filter lid 155 and extend to a space between the second filter body 121 and the third filter body 151

Referring to FIG. 14, when all of the first filter 110, the third filter 150, and the second filter 120 are clogged, the second bypass passage 162 is opened. The substances introduced into the inlet 106 may pass through the second bypass passage 162 and may then be discharged through the outlet 102 without the filtering process. For example, the second bypass passage 162 may be formed between an inner surface of the case lid 105 and an outer surface of the second filter lid 125 and extend to a space between the second filter body 121 and the case 101.

Figure 15:
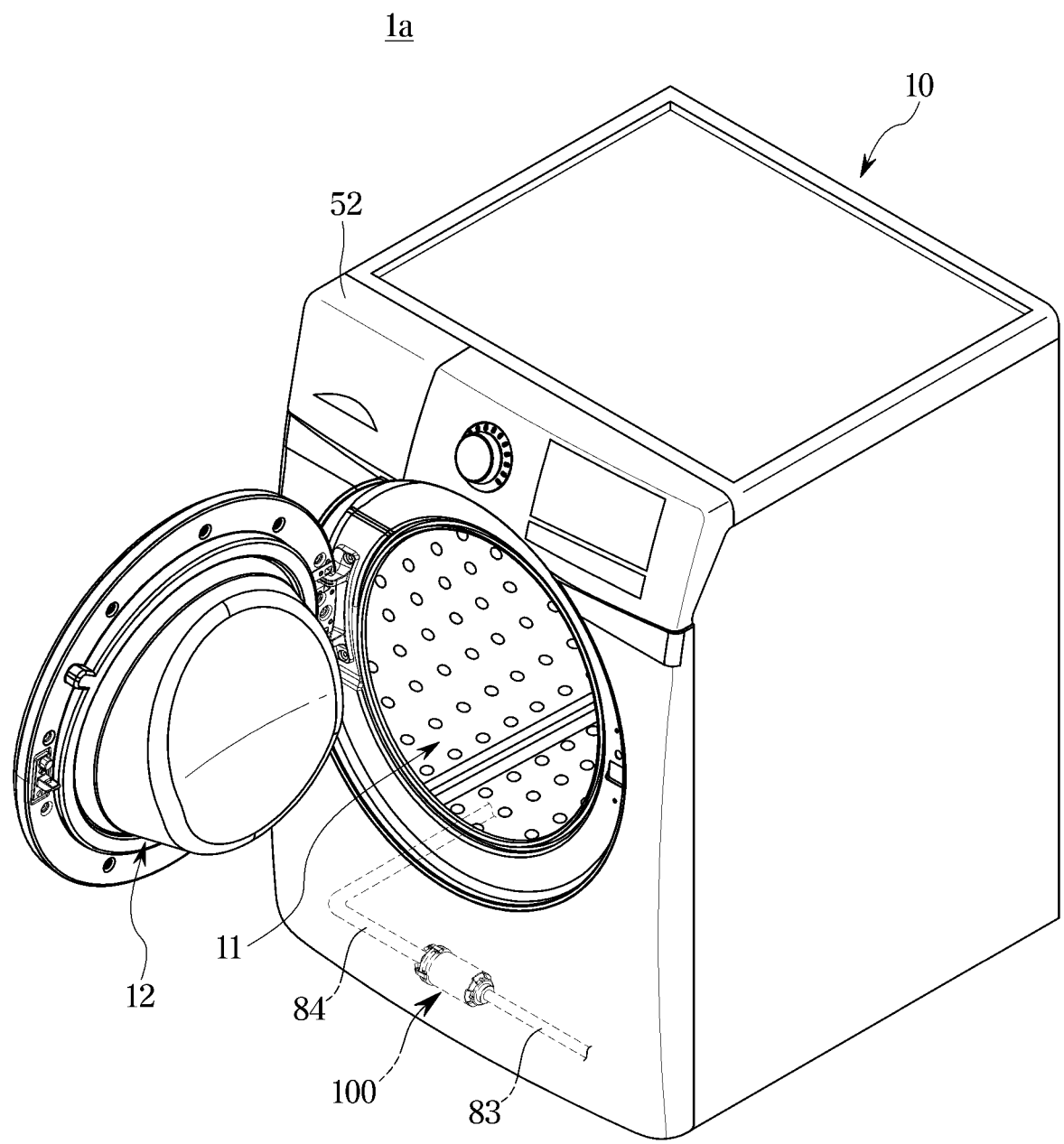
FIG. 15 is a view illustrating a washing machine according to an embodiment of the disclosure.
Figure 16:
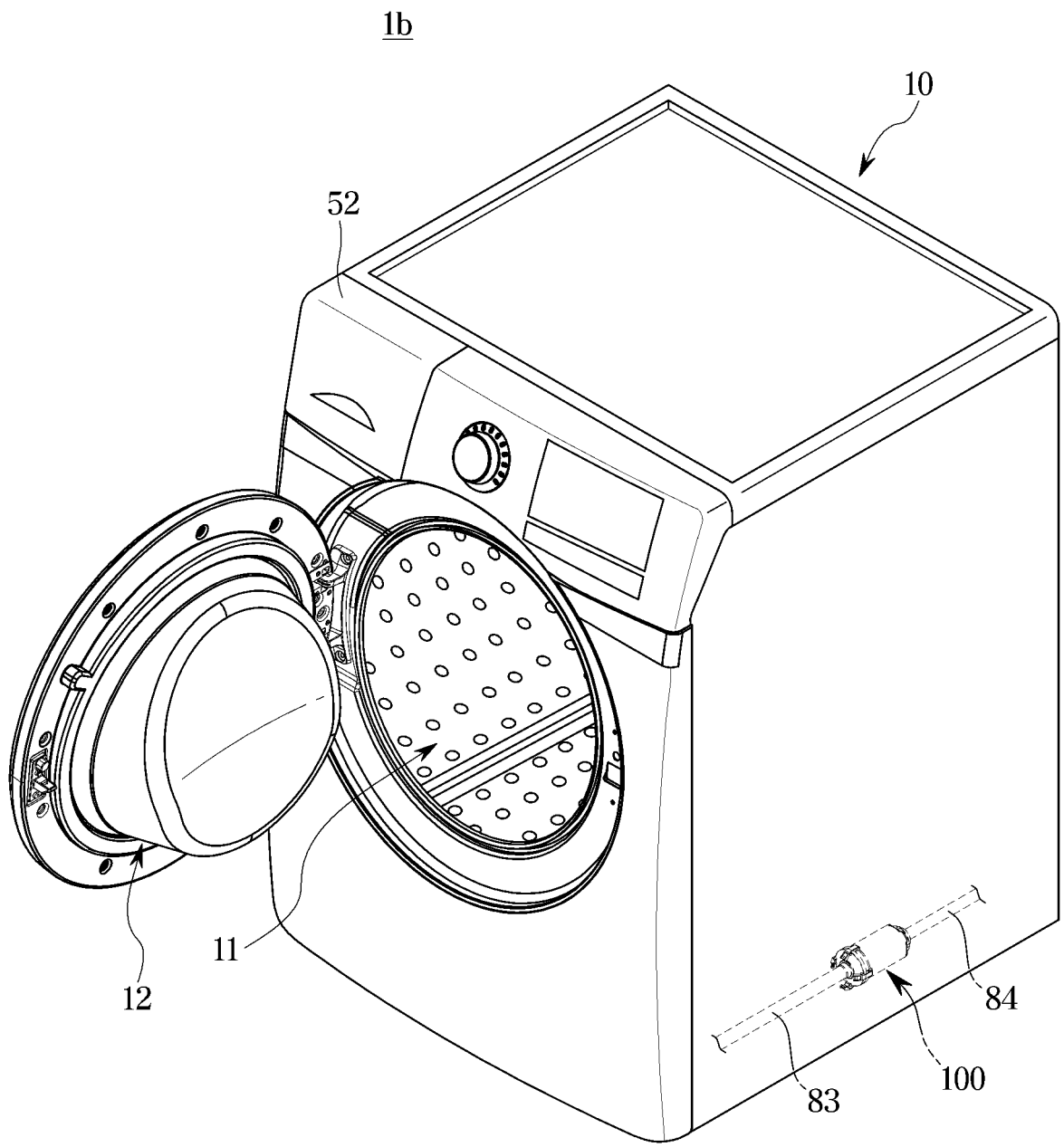
FIG. 16 is a view illustrating a washing machine according to an embodiment of the disclosure.
Figure 17:
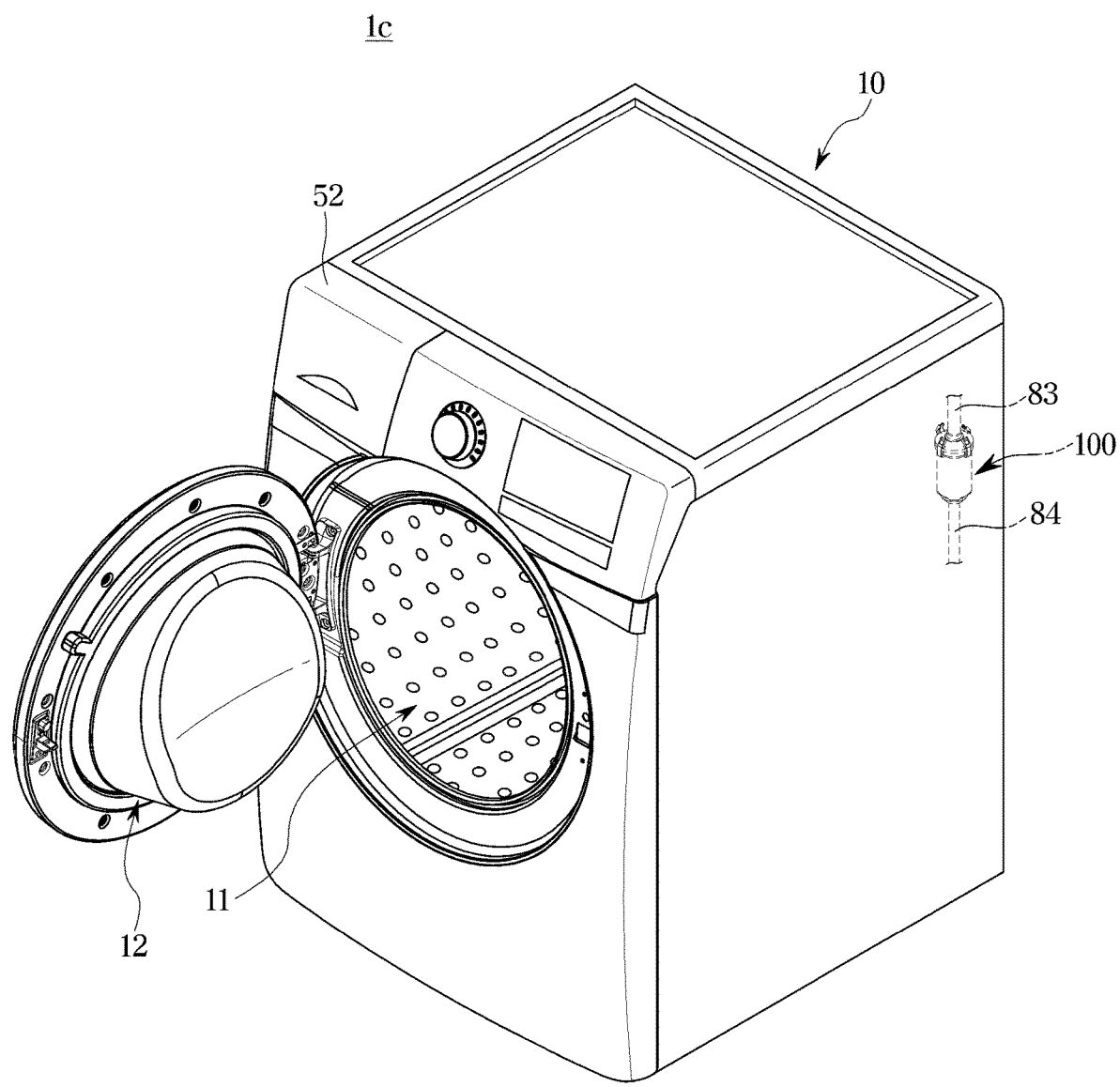
FIG. 17 is a view illustrating a washing machine according to an embodiment of the disclosure.
Figure 18:
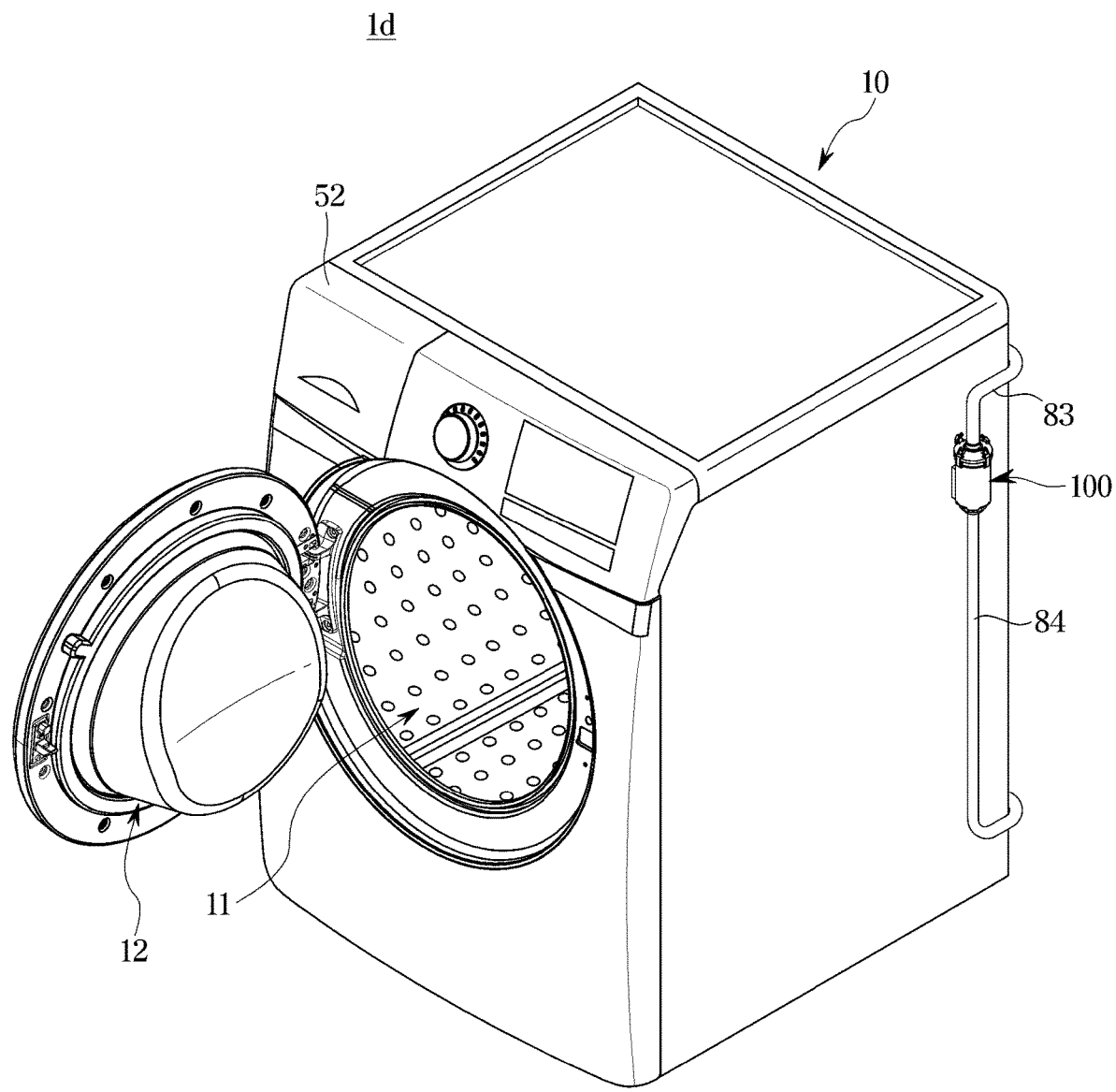
FIG. 18 is a view illustrating a washing machine according to an embodiment of the disclosure.

FIG. 15 is a view illustrating a washing machine according to an embodiment of the disclosure. FIG. 16 is a view illustrating a washing machine according to an embodiment of the disclosure. FIG. 17 is a view illustrating a washing machine according to an embodiment of the disclosure. FIG. 18 is a view illustrating a washing machine according to an embodiment of the disclosure.

Referring to FIGS. 15 to 18, a washing machine in which the filter device 100 according to an embodiment of the disclosure is applied to various locations will be described. The same reference components as those of the washing machine 1 illustrated in FIG. 1 are designated by the same reference numerals, and a detailed description thereof will be omitted.

Referring to FIG. 15, in a washing machine 1a according to an embodiment of the disclosure, the filter device 100 may be located approximately at a center of a lower end of a front side inside the cabinet 10.

Referring to FIG. 16, in a washing machine 1b according to an embodiment of the disclosure, the filter device 100 may be located approximately at a center of a lower end of a right side inside the cabinet 10.

Referring to FIG. 17, in a washing machine 1c according to an embodiment of the disclosure, the filter device 100 may be located on a right side of an upper end of a rear side inside the cabinet 10.

Referring to FIG. 18, in a washing machine 1d according to an embodiment of the disclosure, the filter device 100 may be located on a right side of an upper end of a rear side outside the cabinet 10.

Thus, as described herein, the filter device 100 according to the embodiment of the disclosure may be applied to various locations with respect to the cabinet 10.

Figure 19:
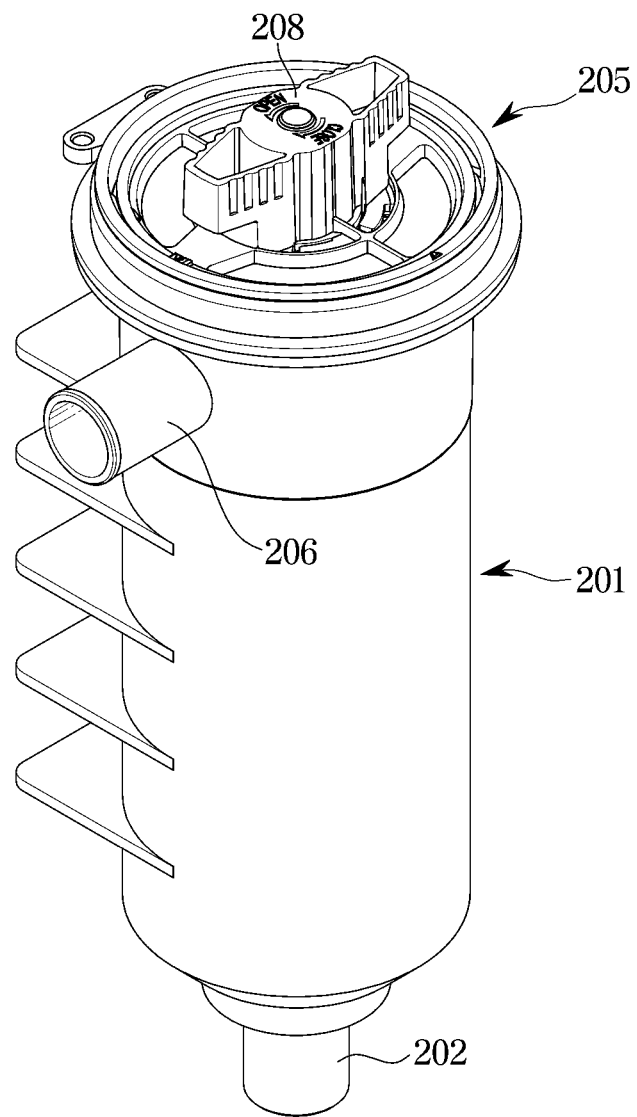
FIG. 19 is a view illustrating a filter device according to an embodiment of the disclosure.
Figure 20:
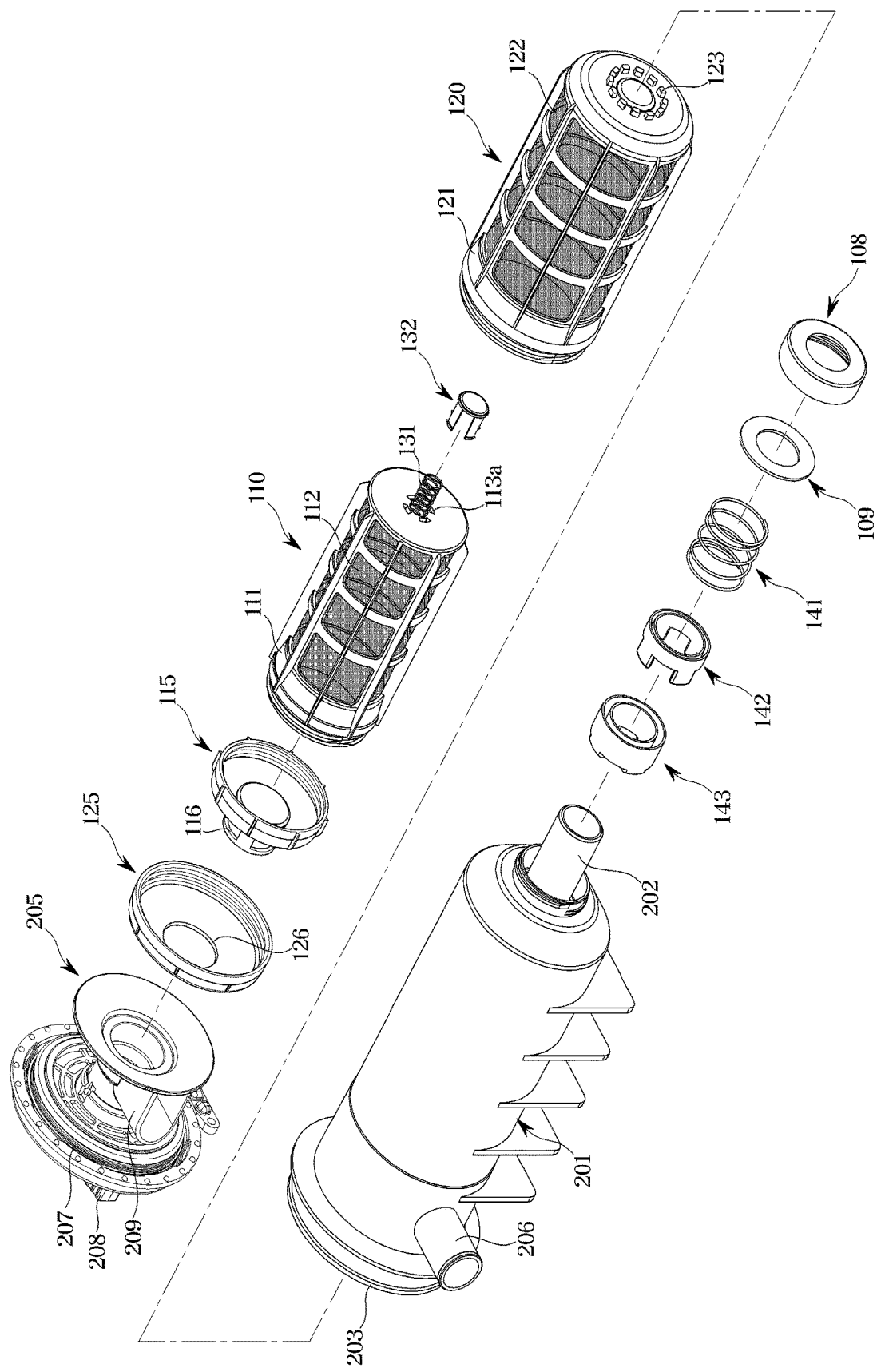
FIG. 20 is an exploded view illustrating the filter device illustrated in FIG. 19.
Figure 21:
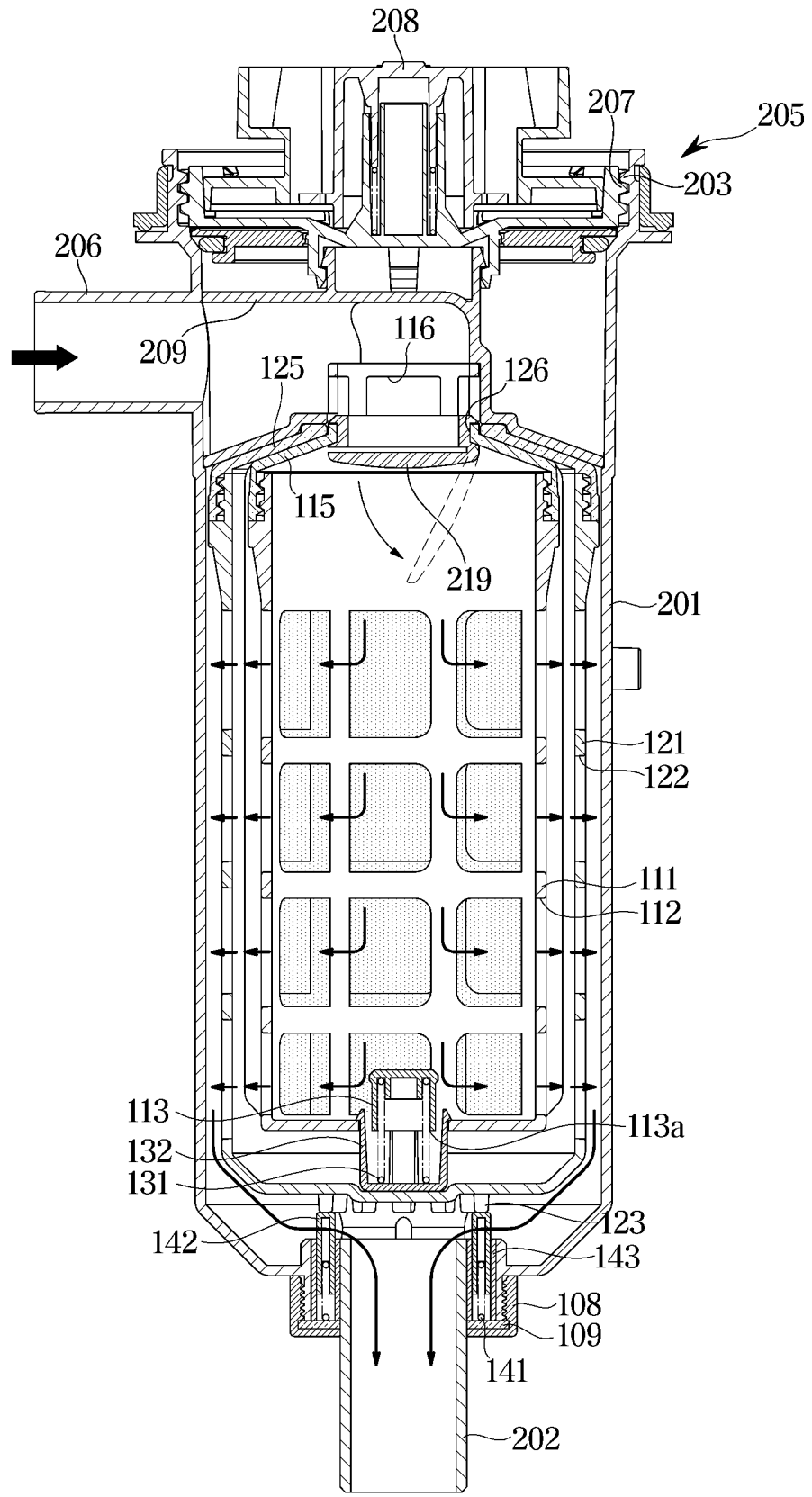
FIG. 21 is a cross-sectional view of the filter device illustrated in FIG. 19.

FIG. 19 is a view illustrating a filter device according to an embodiment of the disclosure. FIG. 20 is an exploded view illustrating the filter device illustrated in FIG. 19. FIG. 21 is a cross-sectional view of the filter device illustrated in FIG. 19.

Referring to FIGS. 19 to 21, a filter device 200 according to an embodiment of the disclosure will be described. However, the same reference components as those of the embodiment illustrated in FIGS. 1 to 7 are designated by the same reference numerals, and a detailed description thereof will be omitted.

Referring to FIGS. 19 to 21, unlike the filter device 100 according to an embodiment illustrated in FIGS. 1 to 7, in the filter device 200, an inlet 206 of a case 201 may extend radially from an outer circumferential surface of the filter device 200. An outlet 202 may extend in a lengthwise direction of the filter device 200. Although not shown, the filter device 200 may also include the sensor 140.

A case lid 205 may include a case coupler 207 provided to be coupled to a lid coupler 203 of the case 201.

The case lid 205 may include a handle 208 provided to be gripped by the user when being separated from the case 201.

The case lid 205 may include a connector 209 provided to communicate with the inlet 206. The connector 209 may guide substances introduced through the inlet 206 into the case 201. The connector 209 may be provided to support the second filter 120.

According to the spirit of the disclosure, in a filter device and a washing machine having the same, since all of a plurality of filters can be used, a lifetime of the filter device can be increased.

According to the spirit of the disclosure, in the filter device and the washing machine having the same, since the plurality of filters can be arranged compactly, the size of the filter device compared to the performance can be reduced.

According to the spirit of the disclosure, in the filter device and the washing machine having the same, since the plurality of filters can be arranged compactly, the performance of the filter device compared to the size can be improved.

According to the spirit of the disclosure, in the filter device and the washing machine having the same, when the filters are clogged, a user is notified of the clogging, and thus convenience of use may be improved.

Hereinabove, example embodiments have been illustrated and described. However, the disclosure is not limited to the above-described embodiments, and those skilled in the art to which the disclosure pertains may derive various changes without departing from the subject matter and technical spirit of the disclosure, the scope of which is described in the appended claims and their equivalents.

What is claimed is:

1. A filter device, comprising:
    a case;
    an internal filter inside the case; and
    an external filter having an accommodating space therein, and being inside the case, wherein
        the internal filter is movable with respect to the external filter inside the accommodating space to a first filtering location and a first bypass location,
        the external filter is movable with respect to the case to a second filtering location and a second bypass location, and
        the external filter and the internal filter are configured so that,
            when the internal filter is in the first filtering location and the external filter is in the second filtering location, substances introduced into the case are filtered by the internal filter and are thereafter filtered by the external filter, and
            when the internal filter is in the first bypass location and the external filter is in the second filtering location, the substances introduced into the case bypass the internal filter to flow between the internal filter and the external filter, and are thereafter filtered by the external filter.

2. The filter device according to claim 1, further comprising:
    a first elastic member configured to support the internal filter so that the internal filter is movable with respect to the external filter inside the accommodating space, and to apply an elastic force in a direction which biases the internal filter to be in the first filtering location.

3. The filter device according to claim 2, wherein the first elastic member is configured to be compressed when the internal filter is in the first filtering location and a pressure of the substances on the internal filter is greater than or equal to a first preset pressure, to thereby move the internal filter from the first filtering location to the first bypass location.

4. The filter device according to claim 3, wherein the internal filter includes a first filter opening configured to open a first bypass passage for the substances introduced into the case to bypass the internal filter when the first elastic member is compressed.

5. The filter device according to claim 2, further comprising:
    a second elastic member configured to support the external filter so that the external filter is movable with respect to the case.

6. The filter device according to claim 5, wherein a first elastic modulus of the first elastic member is smaller than a second elastic modulus of the second elastic member.

7. The filter device according to claim 5, further comprising:
    a sealing member configured to seal the second elastic member and the case.

8. The filter device according to claim 5, wherein the second elastic member is configured to be compressed when the external filter is in the second filtering location and a pressure of the substances on the external filter is greater than or equal to a second preset pressure, to thereby move the external filter from the second filtering location to the second bypass location.

9. The filter device according to claim 5, further comprising:
    a filter support compressed by the second elastic member; and
    a support protrusion protruding from a surface of the external filter to be in contact with the filter support,
    wherein the filter support is configured to form a discharge passage together with the support protrusion, and the discharge passage guides the substances inside the case to outside of the case.

10. The filter device according to claim 1, wherein the external filter and the internal filter are configured so that:
    when the internal filter is in the first bypass location and the external filter is in the second bypass location, the substances introduced into the case bypass the internal filter and the external filter.

11. The filter device according to claim 10, wherein
    the internal filter is configured to move from the first filtering location to the first bypass location due to pressure of the substances on the internal filter when the internal filter is clogged, and
    the external filter is configured to move from the second filtering location to the second bypass location due to pressure of the substances on the external filter when the external filter is clogged.

12. The filter device according to claim 1, further comprising:
    an intermediate filter between the internal filter and the external filter.

13. The filter device according to claim 1, wherein the internal filter is configured to move from the first filtering location to the first bypass location due to pressure of the substances on the internal filter when the internal filter is clogged.

14. A washing machine, comprising:
    a cabinet;
    a tub inside the cabinet to store washing water; and a filter device configured to filter the washing water discharged from the tub, wherein the filter device includes:
a case into which the washing water discharged from the tub is introduceable,
an internal filter inside the case, and
an external filter having an accommodating space therein, and being inside the case, wherein
the internal filter is movable with respect to the external filter inside the accommodating space to a first filtering location and a first bypass location,
the external filter is movable with respect to the case to a second filtering location and a second bypass location, and
the external filter and the internal filter are configured so that,
when the internal filter is in the first filtering location and the external filter is in the second filtering location, the washing water introduced into the case is filtered by the internal filter and is thereafter filtered by the external filter, and
when the internal filter is in the first bypass location and the external filter is in the second filtering location, the washing water introduced into the case bypasses the internal filter to flow between the internal filter and the external filter, and is thereafter filtered by the external filter.

15. The washing machine according to claim 14, wherein the filter device is inside the cabinet.

16. The washing machine according to claim 14, further comprising:
a drainage pump between the tub and the filter device.

17. The washing machine according to claim 14, wherein the external filter and the internal filter are configured so that:
when the internal filter is in the first bypass location and the external filter is in the second bypass location, the washing water introduced into the case bypasses the internal filter and the external filter.

18. The washing machine according to claim 17, wherein
the internal filter is configured to move from the first filtering location to the first bypass location due to pressure of the washing water on the internal filter when the internal filter is clogged, and
the external filter is configured to move from the second filtering location to the second bypass location due to pressure of the washing water on the external filter when the external filter is clogged.

19. The washing machine according to claim 14, wherein the internal filter is configured to move from the first filtering location to the first bypass location due to pressure of the washing water on the internal filter when the internal filter is clogged.

* * * * *